United States Patent
Iacobacci et al.

(10) Patent No.: US 11,235,885 B2
(45) Date of Patent: Feb. 1, 2022

(54) METHOD AND SYSTEM FOR DETERMINING A THROTTLE POSITION OF AN AIRCRAFT

(71) Applicant: PRATT & WHITNEY CANADA CORP., Longueuil (CA)

(72) Inventors: Mark Iacobacci, LaSalle (CA); Michael Krynski, Waterdown (CA); Ivan Koldsgaard, Orangeville (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 190 days.

(21) Appl. No.: 16/751,153

(22) Filed: Jan. 23, 2020

(65) Prior Publication Data

US 2021/0188454 A1    Jun. 24, 2021

Related U.S. Application Data

(60) Provisional application No. 62/951,819, filed on Dec. 20, 2019.

(51) Int. Cl.
*B64D 31/04* (2006.01)
*F01D 21/00* (2006.01)
(Continued)

(52) U.S. Cl.
CPC .......... *B64D 31/04* (2013.01); *F01D 21/003* (2013.01); *F02C 9/20* (2013.01); *G01D 5/04* (2013.01);
(Continued)

(58) Field of Classification Search
CPC ....... B64D 31/04; B64D 31/02; F01D 21/003; F02C 9/20; G01D 5/04; G05G 1/015; F02D 2400/08
See application file for complete search history.

(56) References Cited

U.S. PATENT DOCUMENTS 4,567,786 A * 2/1986 Sakurai ................. B64D 31/04
                                                 244/220
4,597,049 A * 6/1986 Murakami ............ F02D 11/105
                                                 123/350
(Continued)

FOREIGN PATENT DOCUMENTS

CN          2827840 Y     10/2006

OTHER PUBLICATIONS

Extended European Search Report dated May 10, 2021 in connection with corresponding European Patent application No. 20215671.7.

*Primary Examiner* — Joseph J Dallo
(74) *Attorney, Agent, or Firm* — Norton Rose Fulbrighth Canada LLP

(57) ABSTRACT

Systems and methods for determining a throttle position of an aircraft are described herein. A first throttle position is obtained from a first sensor, a second throttle position is obtained from a second sensor, and a third throttle position is obtained from a third sensor. The first, second, and third sensors are separately coupled to a throttle of the aircraft for obtaining independent throttle position measurements therefrom. A difference between the first throttle position and the second throttle position is determined. A mismatch is detected when the difference between the first throttle position and the second throttle position exceeds a threshold. A valid one of the first throttle position and the second throttle position is selected based on the third throttle position, in response to detecting the mismatch. A signal indicative of the throttle position is outputted based on the valid one of the first throttle position and the second throttle position.

20 Claims, 5 Drawing Sheets

(51) Int. Cl.
*F02C 9/20* (2006.01)
*G01D 5/04* (2006.01)
*G05G 1/015* (2008.04)

(52) U.S. Cl.
CPC ......... *G05G 1/015* (2013.01); *F02D 2400/08* (2013.01)

(56) References Cited

U.S. PATENT DOCUMENTS

| | | | | |
|---|---|---|---|---|
| 4,612,615 A * | 9/1986 | Murakami | ............ | B60K 26/00 123/361 |
| 5,029,778 A * | 7/1991 | DeLuca | ............... | G05D 1/0638 244/234 |
| 5,125,602 A * | 6/1992 | Vauvelle | ................. | B64C 13/12 244/223 |
| 5,146,892 A * | 9/1992 | Krampe | ................. | F02D 41/22 123/198 D |
| 5,159,268 A | 10/1992 | Wu | | |
| 5,445,126 A * | 8/1995 | Graves, Jr. | ............ | F02D 11/106 123/399 |
| 5,488,824 A * | 2/1996 | LeDoux | ................. | B64D 31/00 244/234 |
| 5,489,830 A * | 2/1996 | Fernandez | ............. | B64C 13/18 318/584 |
| 5,654,888 A * | 8/1997 | Muller | .................... | B60T 8/885 701/54 |
| 5,816,100 A * | 10/1998 | Fowler | ................. | F16H 59/02 74/335 |
| 6,151,542 A * | 11/2000 | Yoshino | ............... | B60W 10/06 475/198 |
| 6,414,607 B1 * | 7/2002 | Gonring | ................. | G01D 3/10 123/319 |
| 6,443,399 B1 * | 9/2002 | Yount | ................... | B64C 13/503 244/196 |
| 6,512,344 B1 * | 1/2003 | Konno | ............... | B64C 13/0421 318/560 |
| 6,642,685 B2 * | 11/2003 | Onodera | ............... | G05G 9/047 318/568.16 |
| 6,704,643 B1 * | 3/2004 | Suhre | .................... | F02D 11/106 123/399 |
| 6,937,033 B2 * | 8/2005 | Boronkay | ............. | G01D 5/165 324/714 |
| 7,032,570 B2 * | 4/2006 | Watanabe | ............ | F02D 11/106 123/361 |
| 7,140,175 B2 * | 11/2006 | Verniau | ................. | F01D 21/003 60/243 |
| 7,245,289 B2 * | 7/2007 | Matsumoto | ............ | G05G 9/047 345/159 |
| 7,361,067 B1 * | 4/2008 | Smedema | ............... | B63B 34/60 440/1 |
| 7,658,349 B2 * | 2/2010 | Abel | ..................... | B64C 13/503 244/223 |
| 7,702,426 B2 * | 4/2010 | Ito | ........................ | B63H 21/213 701/2 |
| 7,805,225 B2 * | 9/2010 | Okuyama | ........... | B63H 21/213 701/2 |
| 8,074,940 B2 * | 12/2011 | Kopp | ................. | B64C 13/0421 244/229 |
| 8,087,619 B2 * | 1/2012 | Hanlon | ............... | B64C 13/0421 244/223 |
| 8,480,037 B2 | 7/2013 | Belkadi et al. | | |
| 9,550,562 B2 * | 1/2017 | Constans | ............... | B64C 19/00 |
| 10,106,269 B1 | 10/2018 | Thornton et al. | | |
| 10,137,997 B2 | 11/2018 | Nouhaud | | |
| 10,370,088 B2 | 8/2019 | Morrison | | |
| 11,085,391 B2 * | 8/2021 | Hunter | .................... | F02D 11/02 |
| 2003/0000500 A1 * | 1/2003 | Chatfield | ............ | F02D 41/2416 123/438 |
| 2004/0007207 A1 * | 1/2004 | Pursifull | ................. | G05B 9/03 123/399 |
| 2006/0015231 A1 * | 1/2006 | Yoshimura | ............... | B60T 7/12 701/48 |
| 2010/0078524 A1 * | 4/2010 | Boczar | ................. | B64C 27/78 244/235 |
| 2010/0241332 A1 * | 9/2010 | Andrieu | ................. | B64D 31/12 701/100 |
| 2011/0197700 A1 * | 8/2011 | O'Neill | ..................... | G05G 5/03 74/512 |
| 2015/0330810 A1 | 11/2015 | Pointel | | |

\* cited by examiner

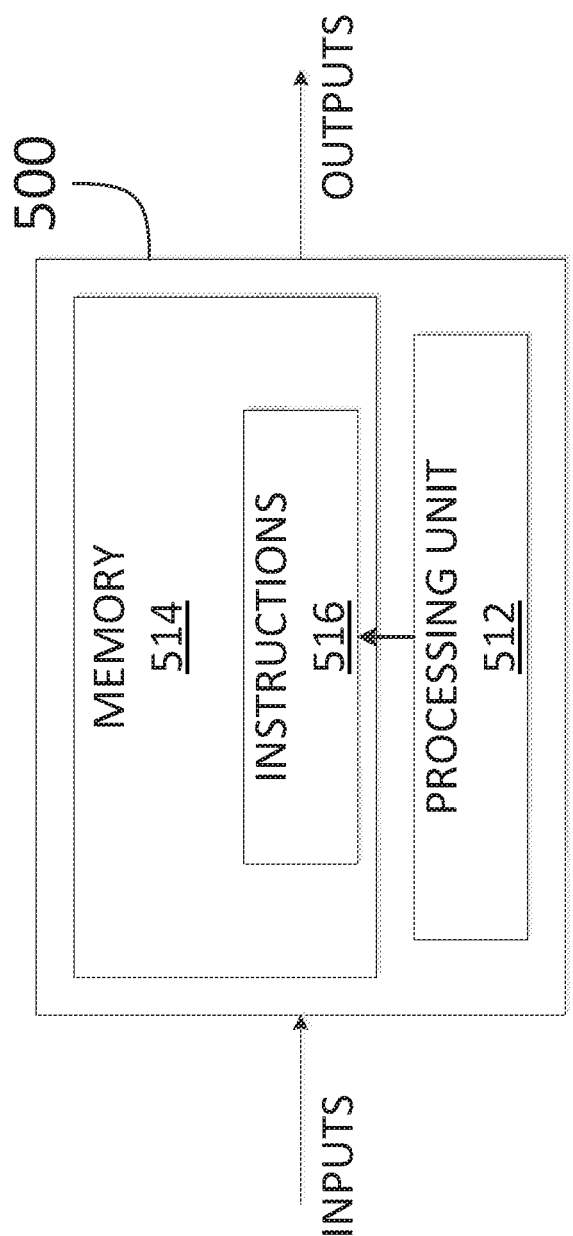

METHOD AND SYSTEM FOR DETERMINING A THROTTLE POSITION OF AN AIRCRAFT

CROSS-REFERENCE TO RELATED APPLICATIONS

The present application claims the benefit of U.S. Provisional Patent Application No. 62/951,819 filed on Dec. 20, 2019, the contents of which are hereby incorporated in their entirety.

TECHNICAL FIELD

The present disclosure relates generally to throttles, and, more particularly, to methods and systems for determining a throttle position of an aircraft.

BACKGROUND OF THE ART

An electronic engine controller (EEC) may be connected to a throttle lever used for controlling operation of an aircraft engine. Prior art systems for determining aircraft throttle lever angle (TLA) at an EEC may be suitable for their intended purposes. However, improvement in the aerospace industry is always desirable.

SUMMARY

In one aspect, there is provided a method for determining a throttle position of an aircraft. The method comprises: obtaining a first throttle position from a first sensor, a second throttle position from a second sensor, and a third throttle position from a third sensor, the first, second, and third sensors separately coupled to a throttle of the aircraft for obtaining independent throttle position measurements therefrom; determining a difference between the first throttle position and the second throttle position; detecting a mismatch when the difference between the first throttle position and the second throttle position exceeds a threshold; in response to detecting the mismatch, selecting a valid one of the first throttle position and the second throttle position based on the third throttle position; and outputting a signal indicative of the throttle position based on the valid one of the first throttle position and the second throttle position.

In one aspect, there is provided an electronic engine controller for determining a throttle position of an aircraft. The electronic engine controller comprises at least one processing unit and at least one non-transitory memory communicatively coupled to the at least one processing unit and comprising computer-readable program instructions. The computer-readable program instructions executable by the at least one processing unit for obtaining a first throttle position from a first sensor, a second throttle position from a second sensor, and a third throttle position from a third sensor, the first, second, and third sensors separately coupled to a throttle of the aircraft for obtaining independent throttle position measurements therefrom; determining a difference between the first throttle position and the second throttle position; detecting a mismatch when the difference between the first throttle position and the second throttle position exceeds a threshold; in response to detecting the mismatch, selecting a valid one of the first throttle position and the second throttle position based on the third throttle position; and outputting a signal indicative of the throttle position based on the valid one of the first throttle position and the second throttle position.

In one aspect, there is provided a system for determining a throttle position of an aircraft. The system comprising: a first sensor, a second sensor and a third sensor separately coupled to a throttle for obtaining independent throttle position measurements therefrom; an electronic engine controller coupled to the first sensor, the second sensor, and the third sensor, the electronic engine controller configured for: obtaining a first throttle position from the first sensor, a second throttle position from the second sensor, and a third throttle position from the third sensor; determining a difference between the first throttle position and the second throttle position; detecting a mismatch when the difference between the first throttle position and the second throttle position exceeds a threshold; in response to detecting the mismatch, selecting a valid one of the first throttle position and the second throttle position based on the third throttle position; and outputting a signal indicative of the throttle position based on the valid one of the first throttle position and the second throttle position.

DESCRIPTION OF THE DRAWINGS

Reference is now made to the accompanying figures in which:

FIG. 5 is an example computing device for implementing a method and/or system for determining a throttle position, in accordance with one or more embodiments.

It will be noted that throughout the appended drawings, like features are identified by like reference numerals.

DETAILED DESCRIPTION

Figure 1:
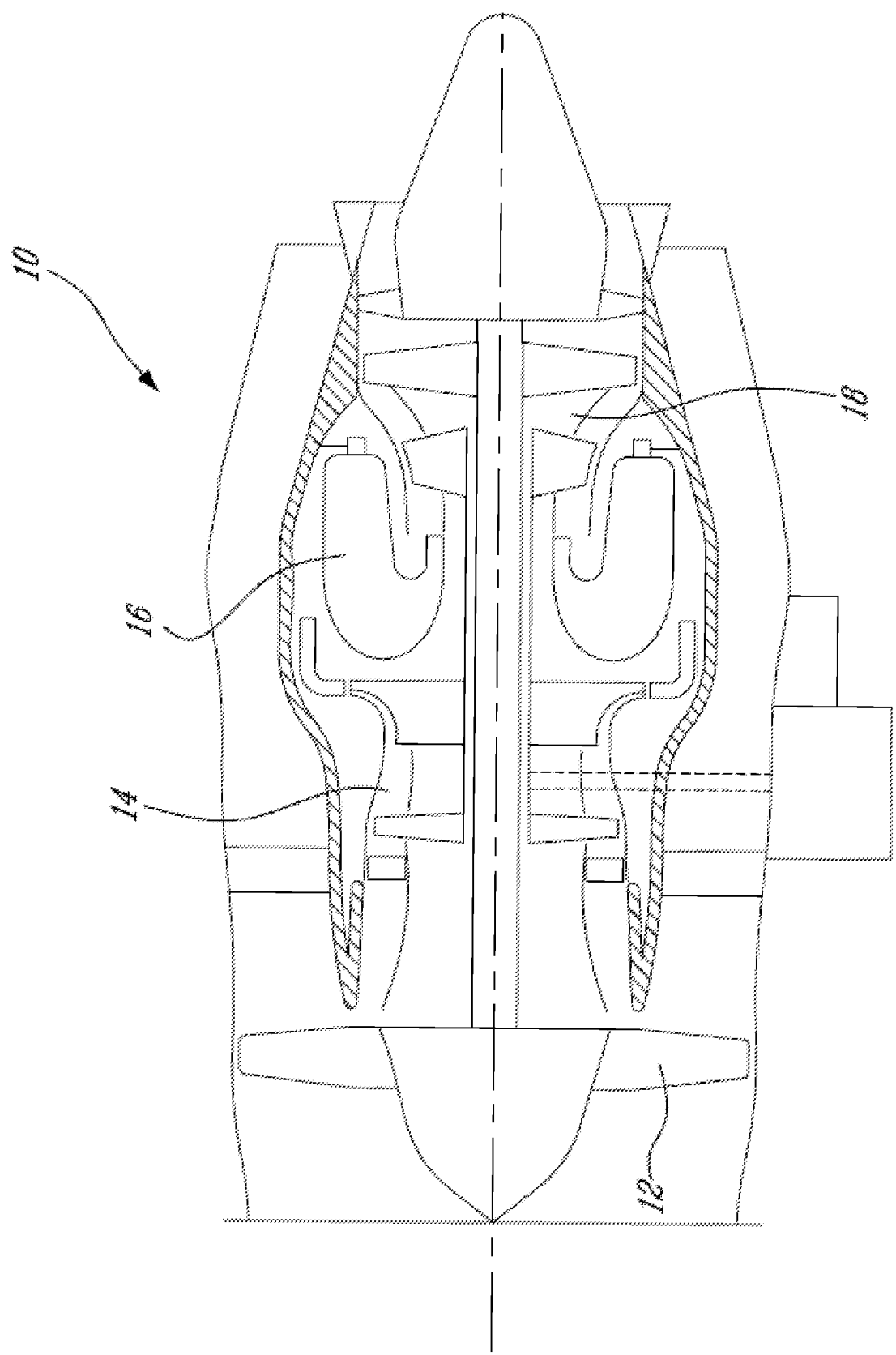
FIG. 1 is a schematic cross-sectional view of an example gas turbine engine, in accordance with one or more embodiments.

FIG. 1 illustrates a gas turbine engine 10, which may be used with the systems and methods for determining a throttle position of an aircraft described herein. The engine 10 generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. Note that while engine 10 is a turbofan engine, the systems and methods for determining a throttle position of an aircraft may be applicable to turboprop engines, turboshaft engines, or other suitable types of aircraft engines.

Figure 2:
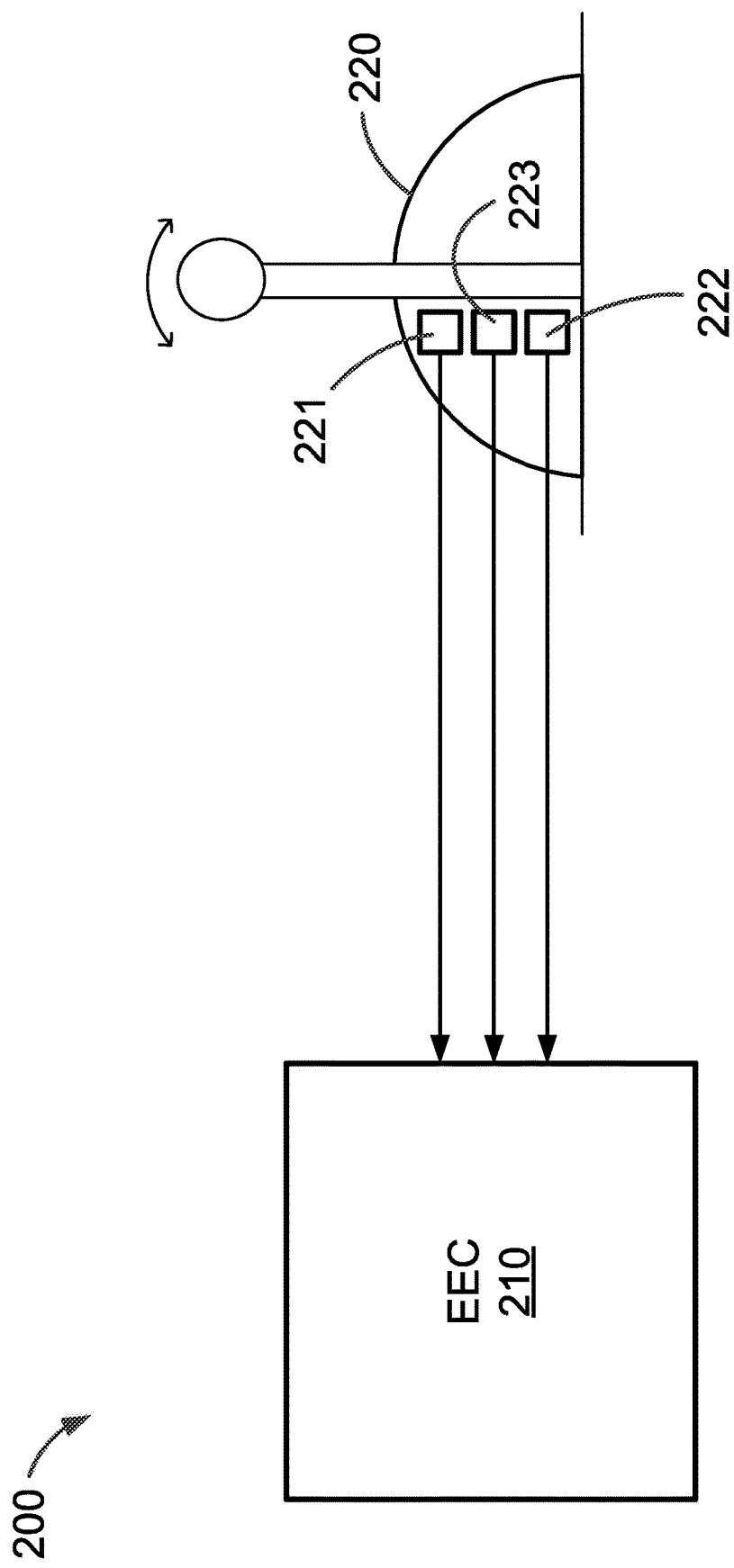
FIG. 2 is a schematic of an example system for determining a throttle position, in accordance with one or more embodiments.

With reference to FIG. 2, a system 200 for determining a throttle position of an aircraft is illustrated. The system 200 comprises an electronic engine controller (EEC) 210. The system 200 may comprise a plurality of sensors 221, 222, 223 connected to the EEC 210. Alternatively, the sensors 221, 222, 223 may be separate from the system 200. The EEC 210 is configured to obtain a first throttle position from a first sensor 221, a second throttle position from a second sensor 222, and a third throttle position from a third sensor 223. The first sensor 221, the second sensor 222, and the third sensor 223 are separately coupled to a throttle 220 of the aircraft for obtaining independent throttle position measurements therefrom. The throttle 220 may be provided as part of the system 200 or separate therefrom. The throttle 220 may be referred to as a throttle quadrant. The EEC 210 is configured to determine a difference between the first throttle position and the second throttle position. The EEC 210 is configured to detect a mismatch when the difference between the first throttle position and the second throttle position exceeds a threshold. The EEC 210 is configured to select a valid one of the first throttle position and the second throttle position based on the third throttle position, in response to detecting the mismatch. The EEC 210 is configured to output a signal indicative of the throttle position based on the valid one of the first throttle position and the second throttle position. The throttle position may be referred to as a throttle lever angle (TLA). The throttle position could be used by the EEC 210 to control operation of the engine. Accordingly, the signal indicative of the throttle position may be a control signal to the engine 10 and/or one or more components of the engine 10 for controlling operation thereof.

The sensors 221, 222, 223 may be any suitable sensors for measuring throttle position. While the sensors 221, 222, 223 are illustrated as being internal to the throttle 220, in some embodiment, one or more of the sensors 221, 222, 223 may be provided external of the throttle 220. One or more of the sensors 221, 222, 223 may be configured for providing an analog signal indicative of the measured throttle position. One or more of the sensors 221, 222, 223 may be configured for providing a digital signal indicative of the measured throttle position. By way of a specific and non-limiting example, the first and second sensors 221, 222 may provide analog signals for the first throttle position and the second throttle position, respectively; and the third sensor 223 may provide a digital signal for the third throttle position. By way of another example, all of the sensors 221, 222, 223 may provide the throttle position digitally. In some embodiments, ARINC 429 communication protocol may be used for transmitting one or more of the first, second and third throttle positions digitally. Any other suitable communication protocol may be used for transmitting the throttle positions. In some embodiments, one or more of the sensors 221, 222, 223 are implemented by a rotary variable differential transformer (RVDT). In some embodiments, one or more of the sensors 221, 222, 223 are implemented by a Hall effect sensor. By way of a specific and non-limiting example, the first sensor 221 may be a first RVDT, the second sensor may be a second RVDT, and the third sensor may be a Hall effect sensor. By way of another example, the first sensor 221 may be a first RVDT, the second sensor may be a second RVDT, and the third sensor may be a third RVDT. Other configurations for the sensor types are contemplated.

The first throttle position, the second throttle position and/or the third throttle position may be continuously received (e.g., in real time) and/or may be received in accordance with any suitable time interval or irregularly. Additionally or alternatively, the first throttle position, the second throttle position and/or the third throttle position may be provided by one or more aircraft or/and engine computers and/or by any other suitable intermediary device(s). The aircraft and/or engine computer and/or intermediary device(s) may be configured for obtaining the first, second and/or third throttle position from the sensor(s) 231, 232 and/or 233.

The threshold used for detecting the mismatch may vary depending on practical implementations. The threshold may be predetermined based on the configuration of one or more of the throttle 220, the sensor 221, 222, 223, and/or the EEC 210. The threshold may be stored in memory and/or a storage device and obtained when needed. Alternatively, the threshold may be determined when needed.

The selection of the valid one of the first throttle position and the second throttle position based on the third throttle position may vary depending on practical implementations. For example, a first throttle position difference between first throttle position and the third throttle position may be determined. A second throttle position difference between the second throttle position and the third throttle position may be determined. The first throttle position difference and the second throttle position difference may be compared to each other to determine which one of the first throttle position difference and the second throttle position difference is smaller. When the first throttle position difference is smaller than the second throttle position difference, then the first throttle position is selected as the valid one. When the second throttle position difference is smaller than the first throttle position difference, then the second throttle position is selected as the valid one.

The signal indicative of the throttle position may correspond to the selected one of the first throttle position and the second throttle position. The signal indicative of the throttle position may be determined based on the selected one of the first throttle position and the second throttle position. The signal indicative of the throttle position may be determined based on the third throttle position and the selected one of the first throttle position and the second throttle position. For example, an average of the third throttle position and the selected one of the first throttle position and the second throttle position may be used to determine the throttle position.

Figure 3:
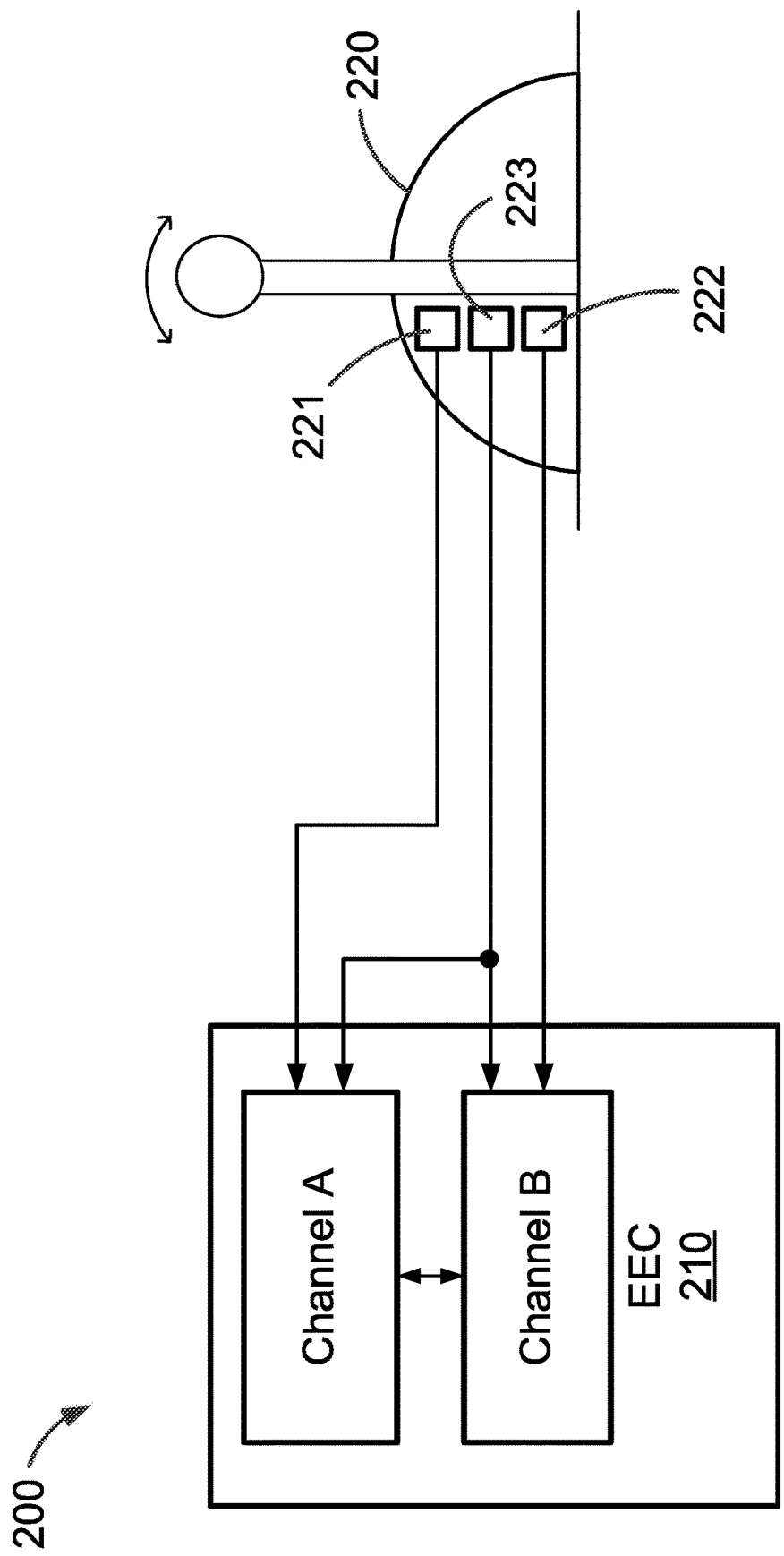
FIG. 3 is a schematic of the system of FIG. 2 with an electronic engine controller having two channels, in accordance with one or more embodiments.

With additional reference to FIG. 3, in some embodiments, the EEC 210 comprises two channels A, B. In some embodiments, the first channel A obtains the first throttle position from the first sensor 221 and the second channel B obtains the second throttle position from the second sensor 222. Alternatively, in some embodiments, both the first channel A and the second channel B obtain the first throttle position from the first sensor 221 and the second throttle position from the second sensor 222. In some embodiments, both channels A, B obtain the third throttle position from the third sensor 223. Alternatively, one of the channels (e.g., channel A) may obtain the third throttle position and provide the third throttle position to the other channel (e.g., channel B). The channels A, B may be in communication with each other for providing their obtained throttle position(s). For example, channel A may provide the first throttle position to channel B, and channel B may provide the second throttle position to channel A.

In some embodiments, one of the channels (e.g., channel A) is selected as being active, while the other channel (e.g., channel B) remains inactive. When a channel is active, that channel is configured to obtain the first throttle position, the second throttle position and the third throttle position. For example, when channel A is active, channel A obtains the first throttle position from the first sensor 221, the second throttle position from the second sensor 222 via channel B, and the third throttle position from the third sensor 223. Similarly, for example, when channel B is active, channel B obtains the first throttle position from the first sensor 221 via channel A, the second throttle position from the second sensor 222, and the third throttle position from the third sensor 223. The active channel is further configured to determine the difference between the first throttle position and the second throttle position, detect the mismatch when the difference exceeds the threshold, and select the valid one of the first throttle position and the second throttle position based on the third throttle position, and output the signal indicative of the throttle position based on the valid one of the first throttle position and the second throttle position.

In some embodiments, whether a channel is active or not, all channels may obtain the first throttle position, the second throttle position and the third throttle position, determine the difference between the first throttle position and the second throttle position, detect the mismatch when the difference exceeds the threshold, and select the valid one of the first throttle position and the second throttle position based on the third throttle position. In such cases, the difference between an active and an inactive channel is that the active channel outputs the signal indicative of the throttle position based on the valid one of the first throttle position and the second throttle position, while the inactive channel remains passive. In this manner, the inactive channel is ready for a transition from inactive to active, such that said transition will be seamless.

It should be appreciated that when there is a discrepancy between a first and second throttle position (e.g., due to cross channel signal mismatch), that a valid one of the first and second throttle position can be determined based on a third throttle position from a third sensor, and the valid throttle position may then be used for controlling engine operation.

The EEC 210 may be interchanged with any other suitable aircraft and/or engine computer and functionality of the EEC 210 described herein may be implemented by that computer.

Figure 4:
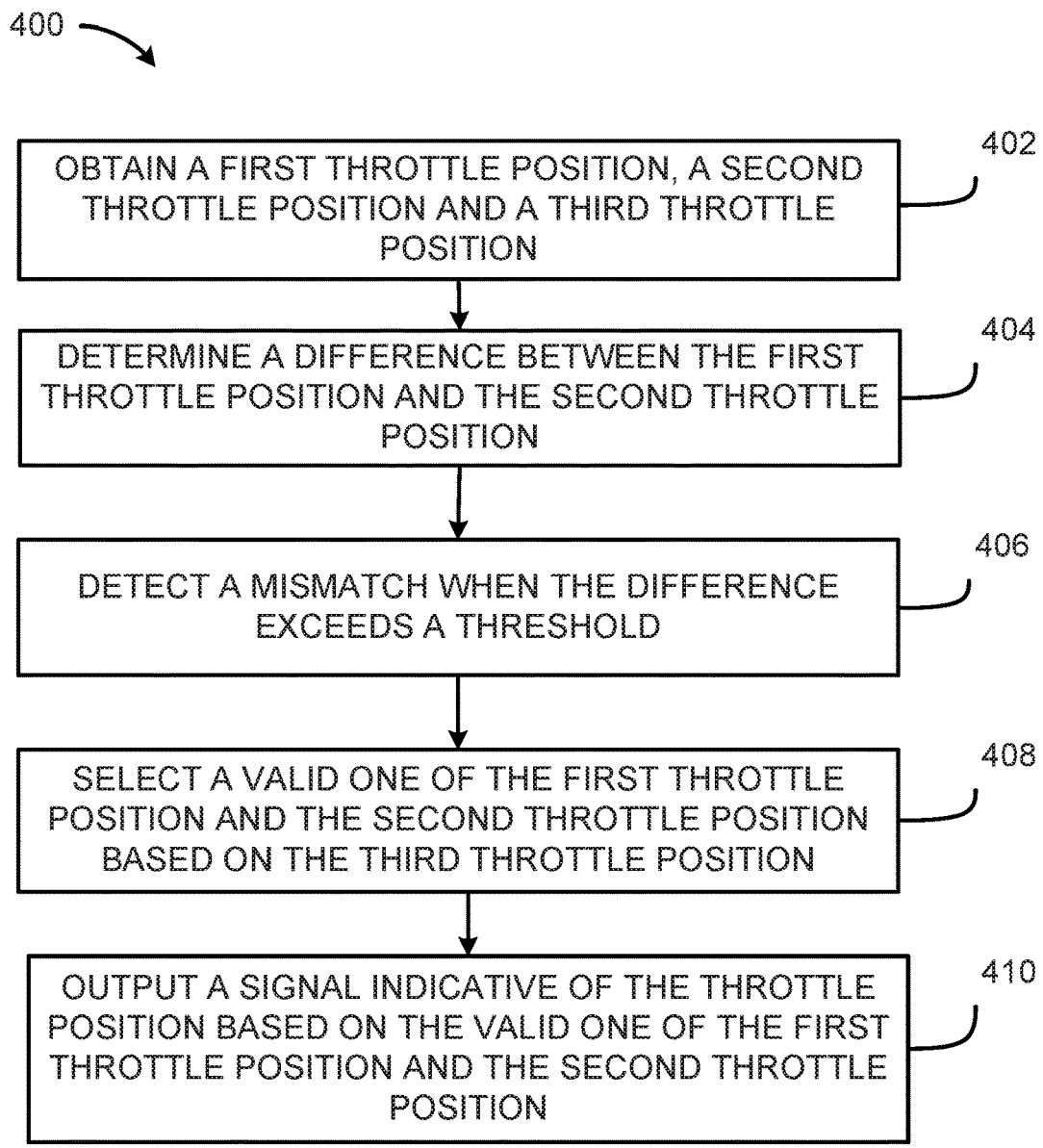
FIG. 4 is a flowchart illustrating an example method for determining a throttle position, in accordance with one or more embodiments.

With reference to FIG. 4, there is shown a flowchart illustrating an example method 400 for determining a throttle position of an aircraft. The method 400 may be implemented by a EEC, such as the EEC 210, or may be implemented by any other suitable engine and/or aircraft computer. While the method 400 is described herein with reference to the system 200 of FIG. 2 and the engine 10 of FIG. 1, this is for example purposes only.

At step 402, a first throttle position, a second throttle position, and a third throttle position are obtained. The first throttle position is obtained from a first sensor 221. The second throttle position is obtained from a second sensor 222. The third throttle position is obtained from a third sensor 223. The first, second, and third sensors 221, 222, 223 are separately coupled to a throttle 220 of the aircraft for obtaining independent throttle position measurements therefrom.

At step 404, a difference between the first throttle position and the second throttle position is determined. The first throttle position and the second throttle position are compared to each other to determine the difference.

A step 406, a mismatch is detected when the difference between the first throttle position and the second throttle position exceeds a threshold. The threshold may be predetermined and obtained from memory and/or a storage device during performance of the method 400 or may be generated during performance of the method 400 in any suitable manner.

At step 408, a valid one of the first throttle position and the second throttle position is selected based on the third throttle position. The valid one of the first throttle position and the second throttle position may be selected in response to detecting the mismatch. In some embodiments, the third throttle position is obtained in response to detecting the mismatch. In other words, in some embodiments, the third throttle position may only be obtained when needed to determine which one of the first and second throttle position is valid.

At step 410, a signal indicative of the throttle position based on the valid one of the first throttle position measurement and the second throttle position is outputted. In some embodiments, the signal indicative of the throttle position corresponds to the valid one of the first throttle position and the second throttle position. In some embodiments, the third throttle position is used in determining the throttle position for the output signal. For example, the signal indicative of the throttle position may correspond to an average of the third throttle position and the valid one of the first throttle position and the second throttle position. Operation of the engine 10 may be controlled based on the valid one of the first throttle position measurement and the second throttle position measurement.

The method 400 may be performed by an active channel of the EEC 210. The active channel may obtain one of the first throttle position from the first sensor 221 and the second throttle position from the second sensor 222 via the passive channel of the EEC 210, for example, as noted above in relation to FIG. 3.

In some embodiments, the third throttle position may be used to select one of the first throttle position and the second throttle position irrespective of whether or not a mismatch is detected. Accordingly, in some embodiments, steps 404 and 406 may be omitted from the method 400.

With reference to FIG. 5, the system 200 and/or the method 400 may be implemented using at least one computing device 500. For example, the EEC 210, may be implemented by at least one computing device 500. In some embodiments, each channel A, B of the EEC 210 is implemented by at least one computing device 500. The computing device 500 comprises a processing unit 512 and a memory 514 which has stored therein computer-executable instructions 516. The processing unit 512 may comprise any suitable devices such that instructions 516, when executed by the computing device 500 or other programmable apparatus, may cause at least in part the functions/acts/steps of the method 400 as described herein to be executed. The processing unit 512 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory 514 may comprise any suitable known or other machine-readable storage medium. The memory 514 may comprise non-transitory computer readable storage medium, for example, but not limited to, an electronic, magnetic, optical, electromagnetic, infrared, or semiconductor system, apparatus, or device, or any suitable combination of the foregoing. The memory 514 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 514 may comprise any storage means (e.g., devices) suitable for retrievably storing machine-readable instructions 516 executable by processing unit 512. In some embodiments, the computing device 500 can be implemented as part of a full-authority digital engine controls (FADEC) or other similar device, including an EEC, an engine control unit (ECU), and the like. In some embodiments, the EEC 210 is implemented by a FADEC.

The methods and systems for determining a throttle position described herein may be implemented in a high level procedural or object oriented programming or scripting language, or a combination thereof, to communicate with or assist in the operation of a computer system, for example the computing device 500. Alternatively, the methods and systems for determining a throttle position may be implemented in assembly or machine language. The language may be a compiled or interpreted language. Program code for implementing the methods and systems for determining a throttle position may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems for determining a throttle position may also be considered to be implemented by way of a non-transitory computer-readable storage medium having a computer program stored thereon. The computer program may comprise computer-readable instructions which cause a computer, or in some embodiments the processing unit 512 of the computing device 500, to operate in a specific and predefined manner to perform the functions described herein.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The embodiments described in this document provide non-limiting examples of possible implementations of the present technology. Upon review of the present disclosure, a person of ordinary skill in the art will recognize that changes may be made to the embodiments described herein without departing from the scope of the present technology. For example, the EEC may be interchanged with any other suitable computing device. By way of another example, the methods and systems described herein may be applied to any suitable engine, such as, for example, industrial engines and/or automobile engines. Yet further modifications could be implemented by a person of ordinary skill in the art in view of the present disclosure, which modifications would be within the scope of the present technology.

The invention claimed is:

1. A method for determining a throttle position of an aircraft, the method comprising:
obtaining a first throttle position from a first sensor, a second throttle position from a second sensor, and a third throttle position from a third sensor, the first, second, and third sensors separately coupled to a throttle of the aircraft for obtaining independent throttle position measurements therefrom;
determining a difference between the first throttle position and the second throttle position;
detecting a mismatch when the difference between the first throttle position and the second throttle position exceeds a threshold;
in response to detecting the mismatch, selecting a valid one of the first throttle position and the second throttle position based on the third throttle position; and
outputting a signal indicative of the throttle position based on the valid one of the first throttle position and the second throttle position.

2. The method of claim 1, wherein the first sensor is a first rotary variable differential transformer and the second sensor is a second rotary variable differential transformer.

3. The method of claim 2, wherein the third sensor is a Hall effect sensor.

4. The method of claim 1, wherein the signal indicative of the throttle position corresponds to the valid one of the first throttle position and the second throttle position.

5. The method of claim 1, wherein the signal indicative of the throttle position corresponds to an average of the third throttle position and the valid one of the first throttle position and the second throttle position.

6. The method of claim 1, wherein selecting the valid one of the first throttle position and the second throttle position comprises:
determining a first throttle position difference between the first throttle position and the third throttle position and determining a second throttle position difference between the second throttle position and third throttle position;
selecting the first throttle position as the valid one when first throttle position difference is smaller than the second throttle position difference and selecting the second throttle position as the valid one when the second throttle position difference is smaller than the first throttle position difference.

7. The method of claim 1, wherein the first sensor is connected to a first channel of an electronic engine controller configured for performing the method, the second sensor is connected to a second channel of the electronic engine controller, and the third sensor is connected to the first channel and the second channel.

8. An electronic engine controller for determining a throttle position of an aircraft, the electronic engine controller comprising:
at least one processing unit; and
at least one non-transitory memory communicatively coupled to the at least one processing unit and comprising computer-readable program instructions executable by the at least one processing unit for:
obtaining a first throttle position from a first sensor, a second throttle position from a second sensor, and a third throttle position from a third sensor, the first, second, and third sensors separately coupled to a throttle of the aircraft for obtaining independent throttle position measurements therefrom;
determining a difference between the first throttle position and the second throttle position;
detecting a mismatch when the difference between the first throttle position and the second throttle position exceeds a threshold;
in response to detecting the mismatch, selecting a valid one of the first throttle position and the second throttle position based on the third throttle position; and
outputting a signal indicative of the throttle position based on the valid one of the first throttle position and the second throttle position.

9. The electronic engine controller of claim 8, wherein the first sensor is a first rotary variable differential transformer and the second sensor is a second rotary variable differential transformer.

10. The electronic engine controller of claim 9, wherein the third sensor is a Hall effect sensor.

11. The electronic engine controller of claim 8, wherein the signal indicative of the throttle position corresponds to the valid one of the first throttle position and the second throttle position.

12. The electronic engine controller of claim 8, wherein the signal indicative of the throttle position corresponds to an average of the third throttle position and the valid one of the first throttle position and the second throttle position.

13. The electronic engine controller of claim 8, wherein selecting the valid one of the first throttle position and the second throttle position comprises:
determining a first throttle position difference between the first throttle position and the third throttle position and determining a second throttle position difference between the second throttle position and third throttle position;
selecting the first throttle position as the valid one when first throttle position difference is smaller than the second throttle position difference and selecting the second throttle position as the valid one when the second throttle position difference is smaller than the first throttle position difference.

14. The electronic engine controller of claim 8, wherein the first sensor is connected to a first channel of the electronic engine controller, the second sensor is connected to a second channel of the electronic engine controller, and the third sensor is connected to the first channel and the second channel of the electronic engine controller.

15. A system for determining a throttle position of an aircraft, the system comprising:
a first sensor, a second sensor and a third sensor separately coupled to a throttle for obtaining independent throttle position measurements therefrom;
an electronic engine controller coupled to the first sensor, the second sensor, and the third sensor, the electronic engine controller configured for:
obtaining a first throttle position from the first sensor, a second throttle position from the second sensor, and a third throttle position from the third sensor;
determining a difference between the first throttle position and the second throttle position;
detecting a mismatch when the difference between the first throttle position and the second throttle position exceeds a threshold;
in response to detecting the mismatch, selecting a valid one of the first throttle position and the second throttle position based on the third throttle position; and
outputting a signal indicative of the throttle position based on the valid one of the first throttle position and the second throttle position.

16. The system of claim 15, wherein the first sensor is a first rotary variable differential transformer and the second sensor is a second rotary variable differential transformer.

17. The system of claim 16, wherein the third sensor is a Hall effect sensor.

18. The system of claim 15, wherein the signal indicative of the throttle position corresponds to the valid one of the first throttle position and the second throttle position.

19. The system of claim 15, wherein the first sensor is connected to a first channel of the electronic engine controller and the second sensor is connected to a second channel of the electronic engine controller.

20. The system of claim 19, wherein the third sensor is connected to the first channel and the second channel of the electronic engine controller.

* * * * *